United States Patent
Leung et al.

(10) Patent No.: US 12,007,242 B2
(45) Date of Patent: *Jun. 11, 2024

(54) SYSTEMS AND METHODS FOR PROVIDING CARBON OFFSETS

(71) Applicant: BlueOwl, LLC, San Francisco, CA (US)

(72) Inventors: Theobolt N. Leung, San Francisco, CA (US); Eric Dahl, Newman Lake, WA (US); Kenneth Jason Sanchez, San Francisco, CA (US)

(73) Assignee: BLUEOWL, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/828,117

(22) Filed: May 31, 2022

(65) Prior Publication Data

US 2022/0292540 A1 Sep. 15, 2022

Related U.S. Application Data

(63) Continuation of application No. 17/686,707, filed on Mar. 4, 2022, which is a continuation of application No. PCT/US2020/003977, filed on Jun. 26, 2020.
(Continued)

(51) Int. Cl.
*G06Q 30/00* (2023.01)
*B60W 40/09* (2012.01)
(Continued)

(52) U.S. Cl.
CPC ......... *G01C 21/3469* (2013.01); *B60W 40/09* (2013.01); *B60W 50/10* (2013.01);
(Continued)

(58) Field of Classification Search
CPC ............ G06Q 30/0224; G06Q 30/018; G06Q 30/0201; G06Q 50/06; G06Q 50/40;
(Continued)

(56) References Cited

U.S. PATENT DOCUMENTS 10,565,593 B1 * 2/2020 Aabram ............... G06Q 20/405
10,832,342 B1 11/2020 Gregorio et al.
(Continued)

FOREIGN PATENT DOCUMENTS

CN 107730425 A 2/2018
JP 2014-021725 A 2/2014
(Continued)

OTHER PUBLICATIONS

"Vehicle Electrification: Status and Issues". IEEE. 2011. (Year: 2011).*
(Continued)

*Primary Examiner* — Maria V Vanderhorst
(74) *Attorney, Agent, or Firm* — BRYAN CAVE LEIGHTON PAISNER LLP

(57) ABSTRACT

Method and system for providing carbon offsets. For example, the method includes collecting mindful driving data for one or more vehicle trips made by a user, analyzing the mindful driving data to determine a level of mindful driving of the user, determining a level of carbon offset reward based at least in part upon the level of mindful driving of the user, determining an amount of total carbon emission of the user, and providing an amount of carbon offset reward based at least in part upon the level of carbon offset reward and the amount of total carbon emission.

17 Claims, 8 Drawing Sheets

Related U.S. Application Data

(60) Provisional application No. 62/899,038, filed on Sep. 11, 2019.

(51) Int. Cl.

| | | |
|---|---|---|
| *B60W 50/10* | (2012.01) | |
| *G01C 21/34* | (2006.01) | |
| *G01C 21/36* | (2006.01) | |
| *G06Q 30/018* | (2023.01) | |
| *G06Q 30/0201* | (2023.01) | |
| *G06Q 30/0207* | (2023.01) | |
| *G07C 5/04* | (2006.01) | |
| *G05B 19/418* | (2006.01) | |
| *G06Q 50/06* | (2012.01) | |
| *G06Q 50/40* | (2024.01) | |

(52) U.S. Cl.
CPC ..... *G01C 21/3484* (2013.01); *G01C 21/3492* (2013.01); *G01C 21/3617* (2013.01); *G06Q 30/018* (2013.01); *G06Q 30/0201* (2013.01); *G06Q 30/0224* (2013.01); *G07C 5/04* (2013.01); *B60W 2510/0638* (2013.01); *B60W 2530/209* (2020.02); *B60W 2540/30* (2013.01); *G06Q 50/06* (2013.01); *G06Q 50/40* (2024.01)

(58) Field of Classification Search
CPC ................ G06Q 10/04; G01C 21/3469; G01C 21/3484; G01C 21/3492; G01C 21/3617; B60W 40/09; B60W 50/10; B60W 2510/0638; B60W 2530/209; B60W 2540/30; B60W 50/0097; B60W 10/06; B60W 50/08; B60W 50/14; G07C 5/04; G07C 5/008; G07C 5/0808; Y02T 10/40
See application file for complete search history.

(56) References Cited

U.S. PATENT DOCUMENTS

| | | | |
|---|---|---|---|
| 10,915,964 B1 | 2/2021 | Purgatorio et al. | |
| 2008/0059206 A1* | 3/2008 | Jenkins | G06Q 99/00 705/500 |
| 2008/0125958 A1 | 5/2008 | Boss et al. | |
| 2009/0157510 A1 | 6/2009 | Pridmore et al. | |
| 2009/0210295 A1 | 8/2009 | Edholm et al. | |
| 2010/0049397 A1 | 2/2010 | Liu et al. | |
| 2010/0057339 A1 | 3/2010 | Pryakhin et al. | |
| 2010/0106603 A1 | 4/2010 | Dey et al. | |
| 2010/0321910 A1 | 12/2010 | Hsu et al. | |
| 2011/0100773 A1 | 5/2011 | Hidaka et al. | |
| 2011/0106370 A1 | 5/2011 | Duddle et al. | |
| 2012/0232783 A1 | 9/2012 | Calkins et al. | |
| 2013/0166326 A1 | 6/2013 | Lavie et al. | |
| 2013/0246133 A1* | 9/2013 | Dembo | G06Q 10/30 705/14.1 |
| 2013/0261966 A1 | 10/2013 | Wang et al. | |
| 2014/0236466 A1 | 8/2014 | Doron | |
| 2014/0277835 A1 | 9/2014 | Filev et al. | |
| 2014/0309914 A1 | 10/2014 | Scofield et al. | |
| 2015/0120107 A1 | 4/2015 | Yu et al. | |
| 2015/0226563 A1 | 8/2015 | Cox et al. | |
| 2016/0034910 A1 | 2/2016 | Davis | |
| 2016/0092899 A1 | 3/2016 | Osberg | |
| 2016/0221578 A1 | 8/2016 | Tang et al. | |
| 2017/0146362 A1 | 5/2017 | Bai et al. | |
| 2017/0323244 A1* | 11/2017 | Rani | G07C 5/02 |
| 2017/0351978 A1 | 12/2017 | Bellowe | |
| 2018/0058868 A1 | 3/2018 | Kang et al. | |
| 2018/0174485 A1 | 6/2018 | Stankoulov | |
| 2018/0285885 A1* | 10/2018 | Laberteaux | H04L 9/3247 |
| 2019/0217793 A1 | 7/2019 | Van Hoecke et al. | |
| 2020/0074492 A1* | 3/2020 | Scholl | G06Q 50/30 |

FOREIGN PATENT DOCUMENTS

| | | |
|---|---|---|
| KR | 10-1484225 B1 | 1/2015 |
| WO | 2009/125178 A2 | 10/2009 |

OTHER PUBLICATIONS

"CarbonRecorder: A Mobile-Social Vehicular Carbon Emission Tracking Application Suite". IEEE. 2011. (Year: 2011).*

International Search Report and Written Opinion received for PCT Patent Application No. PCT/US2020/039768, dated Sep. 2, 2020, 7 pages.

International Search Report and Written Opinion received for PCT Patent Application No. PCT/US2020/039777, dated Oct. 29, 2020, 13 pages.

International Search Report and Written Opinion received for PCT Patent Application No. PCT/US2020/039813, dated Sep. 14, 2020, 25 pages.

International Search Report and Written Opinion received for PCT Patent Application No. PCT/US2020/042306, dated Oct. 2, 2020, 19 pages.

Ojeda et al. "Fuel consumption prediction for heavy-duty vehicles using digital maps", 2017 IEEE 20th International Conference on Intelligent Transportation Systems (ITSC), 2017, 7 pages.

Campolina et al., "Fuel Efficient Routes Using Vehicular Sensor Data" Mobility Management And Wireless Access, pp. 29-36 (2018).

* cited by examiner

SYSTEMS AND METHODS FOR PROVIDING CARBON OFFSETS

CROSS-REFERENCE TO RELATED APPLICATIONS

This application is a continuation of U.S. patent application Ser. No. 17/686,707, filed Mar. 4, 2022, which is a continuation of International PCT Application No. PCT/US2020/039777, filed Jun. 26, 2020, which claims priority to U.S. Provisional Patent Application No. 62/899,038, filed Sep. 11, 2019, incorporated by reference herein for all purposes.

FIELD OF THE DISCLOSURE

Some embodiments of the present disclosure are directed to providing carbon offsets. More particularly, certain embodiments of the present disclosure provide methods and systems for offering carbon offsets to compensate for carbon emissions generated during a user's vehicle trips. Merely by way of example, the present disclosure has been applied to offering carbon offsets based at least in part upon the user's mindful driving. But it would be recognized that the present disclosure has much broader range of applicability.

BACKGROUND OF THE DISCLOSURE

Carbon emissions from vehicles represent a major contributor to climate change. While new vehicle technologies have been developed to curb carbon emissions, the continued use of vehicles for private transportation will cause the amount of carbon emissions to remain high or even increase. Hence it is highly desirable to develop additional approaches that compensate for the release of these carbon emissions.

BRIEF SUMMARY OF THE DISCLOSURE

Some embodiments of the present disclosure are directed to providing carbon offsets. More particularly, certain embodiments of the present disclosure provide methods and systems for offering carbon offsets to compensate for carbon emissions generated during a user's vehicle trips. Merely by way of example, the present disclosure has been applied to offering carbon offsets based at least in part upon the user's mindful driving. But it would be recognized that the present disclosure has much broader range of applicability.

According to some embodiments, a method for providing one or more carbon offsets includes collecting mindful driving data for one or more first vehicle trips made by a user. The mindful driving data includes information related to a mindful driving behavior of the user. Also, the method includes analyzing the mindful driving data to determine a level of mindful driving of the user. Additionally, the method includes determining a level of carbon offset reward based at least in part upon the level of mindful driving of the user and an amount of total carbon emission of the user. Moreover, the method includes providing an amount of carbon offset reward based at least in part upon the level of carbon offset reward and the amount of total carbon emission.

According to certain embodiments, a computing device for providing one or more carbon offsets includes one or more processors and a memory that stores instructions for execution by the one or more processors. The instructions, when executed, cause the one or more processors to collect mindful driving data for one or more first vehicle trips made by a user. The mindful driving data includes information related to a mindful driving behavior of the user. Also, the instructions, when executed, cause the one or more processors to analyze the mindful driving data to determine a level of mindful driving of the user. Additionally, the instructions, when executed, cause the one or more processors to determine a level of carbon offset reward based at least in part upon the level of mindful driving of the user and an amount of total carbon emission of the user. Moreover, the instructions, when executed, cause the one or more processors to provide an amount of carbon offset reward based at least in part upon the level of carbon offset reward and the amount of total carbon emission.

According to some embodiments, a non-transitory computer-readable medium stores instructions for providing one or more carbon offsets. The instructions are executed by one or more processors of a computing device. The non-transitory computer-readable medium includes instructions to collect mindful driving data for one or more first vehicle trips made by a user. The mindful driving data includes information related to a mindful driving behavior of the user. Also, the non-transitory computer-readable medium includes instructions to analyze the mindful driving data to determine a level of mindful driving of the user. Additionally, the non-transitory computer-readable medium includes instructions to determine a level of carbon offset reward based at least in part upon the level of mindful driving of the user and an amount of total carbon emission of the user. Moreover, the non-transitory computer-readable medium includes instructions to provide an amount of carbon offset reward based at least in part upon the level of carbon offset reward and the amount of total carbon emission.

Depending upon the embodiment, one or more benefits may be achieved. These benefits and various additional objects, features and advantages of the present disclosure can be fully appreciated with reference to the detailed description and accompanying drawings that follow.

DETAILED DESCRIPTION OF THE DISCLOSURE

Some embodiments of the present disclosure are directed to providing carbon offsets. More particularly, certain embodiments of the present disclosure provide methods and systems for offering carbon offsets to compensate for carbon emissions generated during a user's vehicle trips. Merely by way of example, the present disclosure has been applied to offering carbon offsets based at least in part upon the user's mindful driving. But it would be recognized that the present disclosure has much broader range of applicability.

As described herein, carbon offsets (e.g., carbon credits) are used to measure the removal of certain amounts of carbon dioxide and/or other greenhouse gases (e.g., nitrous oxide, methane, perfluorocarbons, hydrofluorocarbons, and/or sulfur hexafluoride) from the atmosphere. According to various embodiments, to offset carbon emissions, trees are planted to recapture and store the released carbon. In certain embodiments, other efforts, such as implementing renewable energy or energy conservation, are used to offset carbon emissions.

Figure 1:
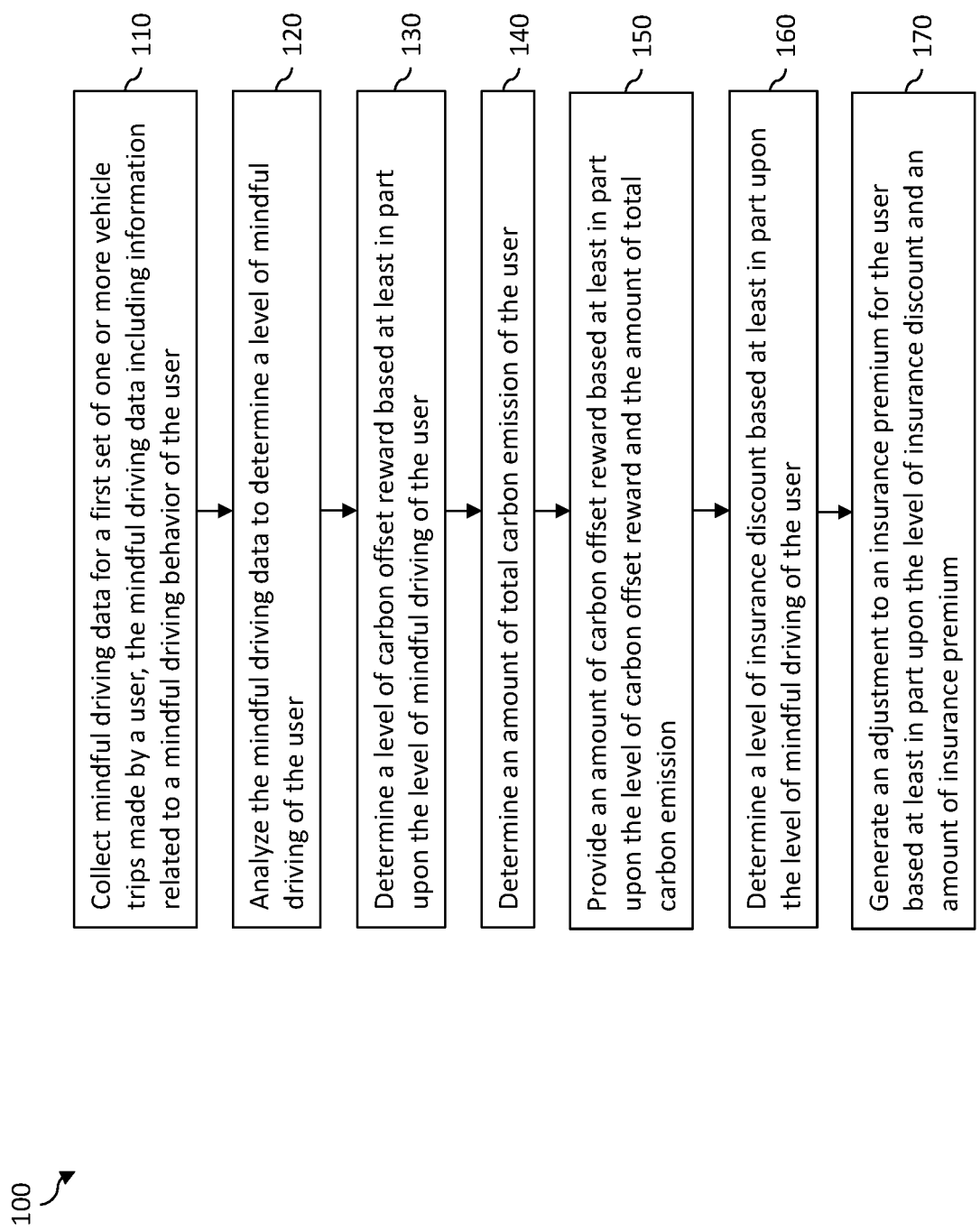
FIG. 1 is a simplified method for providing carbon offsets according to certain embodiments of the present disclosure.

I. One or More Methods for Providing Carbon Offsets According to Certain Embodiments FIG. 1 is a simplified method for providing carbon offsets according to certain embodiments of the present disclosure. This diagram is merely an example, which should not unduly limit the scope of the claims. One of ordinary skill in the art would recognize many variations, alternatives, and modifications. The method 100 includes process 110 for collecting mindful driving data for vehicle trips made by a user, process 120 for determining a level of mindful driving, process 130 for determining a level of carbon offset reward, process 140 for determining an amount of total carbon emission, process 150 for providing an amount of carbon offset reward, process 160 for determining a level of insurance discount, and process 170 for generating an adjustment to an insurance premium. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, some or all processes of the method are performed by a computing device or a processor directed by instructions stored in memory. As an example, some or all processes of the method are performed according to instructions stored in a non-transitory computer-readable medium.

Specifically, at the process 110, the mindful driving data are collected for a first set of one or more vehicle trips made by the user according to some embodiments. As an example, the mindful driving data include information related to a mindful driving behavior of the user. In certain embodiments, the user is a driver of a vehicle during the first set of one or more vehicle trips. According to various embodiments, the mindful driving data indicate how careful the user is in driving the vehicle, such as how frequently the user drives, types of maneuvers that the user makes while driving (e.g., hard cornering, hard braking, sudden acceleration, smooth acceleration, slowing before turning), types of roads that the user drives on (e.g., highways, local roads, off-roads), number of reported accidents/collisions, types of dangerous driving events (e.g., cell phone usage while driving, eating while driving, falling asleep while driving), and/or types of safe driving events (e.g., maintaining safe following distance, turning on headlights, observing traffic lights, yielding to pedestrians, obeying speed limits).

According to certain embodiments, the mindful driving data are collected from one or more sensors associated with the vehicle operated by the user. For example, the one or more sensors include any type and number of accelerometers, gyroscopes, magnetometers, barometers, location sensors (e.g., GPS sensors), tilt sensors, yaw rate sensors, speedometers, brake sensors, airbag deployment sensors, headlight sensors, steering angle sensors, gear position sensors, proximity detectors, and/or any other suitable sensors that measure vehicle state and/or operation. In some embodiments, the one or more sensors are part of or located in the vehicle. In certain embodiments, the one or more sensors are part of a computing device (e.g., a mobile device of the user) that is connected to the vehicle while the vehicle is in operation. According to some embodiments, the mindful driving data are collected continuously or at predetermined time intervals. According to certain embodiments, the mindful driving data are collected based on a triggering event. For example, the mindful driving data are collected when each sensor has acquired a threshold amount of sensor measurements.

At the process 120, the mindful driving data are analyzed to determine the level of mindful driving of the user according to certain embodiments. For example, a high level of mindful driving is determined if analysis of the mindful driving data shows that the user always exercises safe driving with no reported accidents/collisions. As an example, a medium level of mindful driving is determined if analysis of the mindful driving data shows that the user exercises safe driving but has one or two reported accidents/collisions. For example, a low level of mindful driving is determined if analysis of the mindful driving data shows that the user exercises reckless driving with multiple reported accidents/collisions. In some embodiments, the level of mindful driving is represented as a numerical score. For example, a score of 90 and above indicates a high level of mindful driving of the user. In certain embodiments, mindful driving is used as a measure that incorporates collision risk, gas consumption, and/or other factors related to driving.

At the process 130, the level of carbon offset reward is determined based at least in part upon the level of mindful driving of the user according to some embodiments. For example, a high level of mindful driving produces a high level of carbon offset reward whereas a low level of mindful driving results in a low level of carbon offset reward. In certain embodiments, as long as the user maintains a high level of mindful driving, the level of carbon offset reward will be equally high regardless of how much driving has taken place. In some embodiments, the level of carbon offset reward represents a percentage value of carbon offset reward. For example, a low level of mindful driving yields a 0% carbon offset reward, a medium level of mindful driving yields a 20% carbon offset reward, and a high level of mindful driving yields a 50% carbon offset reward.

At the process 140, the amount of total carbon emission of the user is determined according to certain embodiments. As an example, the amount of total carbon emission represents how much carbon pollution (e.g., carbon dioxide) that the user has generated by driving the vehicle during the first set of one or more vehicle trips. In some embodiments, the amount of total carbon emission represents at least a part of the user's overall carbon footprint. In certain embodiments, the amount of total carbon emission corresponds to an amount of cost (e.g., money) needed to completely recapture the amount of total carbon emission. For example, to recapture the amount of total carbon emission of the user, a number of trees need to be planted. As an example, the amount of cost is equal to the number of trees that need to be planted multiplied by the cost of planting each tree.

At the process 150, the amount of carbon offset reward is provided based at least in part upon the level of carbon offset reward and the amount of total carbon emission according to some embodiments. In certain embodiments, the amount of carbon offset reward is determined to be equal to the amount of cost needed to completely recapture the amount of total carbon emission multiplied by the percentage value of carbon offset reward. For example, if the percentage value is 20%, then the amount of carbon offset reward is 20% of the cost needed to completely recapture the amount of total carbon emission. As an example, the user does not receive the amount of carbon offset reward. For example, an insurance company pays the amount of carbon offset reward to another company to plant trees on the user's behalf in order to completely recapture the user's carbon emission. In various embodiments, the planting of trees is performed by an entity engaged in carbon emission reduction projects or programs. In some embodiments, the user can select a desired type of tree to plant and/or a desired location to plant a tree.

At the process 160, the level of insurance discount is determined based at least in part upon the level of mindful driving of the user according to certain embodiments. For example, high levels of mindful driving result in high levels of insurance discount. As an example, at the process 160, the level of mindful driving is used to prequalify the user for an insurance policy and/or a starting discount on an insurance policy. For example, at the process 160, an insurance marketing offer, an eligibility qualification, and/or a quote amount is determined based at least in part upon the level of mindful driving of the user.

At the process 170, the adjustment to the insurance premium for the user is generated based at least in part upon the level of insurance discount and an amount of insurance premium (e.g., an original insurance premium of the user). For example, the adjustment to the insurance premium is in the form of monetary payments (e.g., cash) that the user receives. In some embodiments, the level of insurance discount is a percentage value that is applied to adjust (e.g., reduce) the amount of insurance premium. In certain embodiments, the level of insurance discount is a lump sum of cash that is applied to adjust (e.g., reduce) the amount of insurance premium. In some embodiments, the level of insurance discount is applied to the amount of insurance premium at a future time (e.g., at a premium renewal date).

As discussed above and further emphasized here, FIG. 1 is merely an example, which should not unduly limit the scope of the claims. One of ordinary skill in the art would recognize many variations, alternatives, and modifications. For example, the process 160 and/or the process 170 are optional according to some embodiments.

Figure 2:
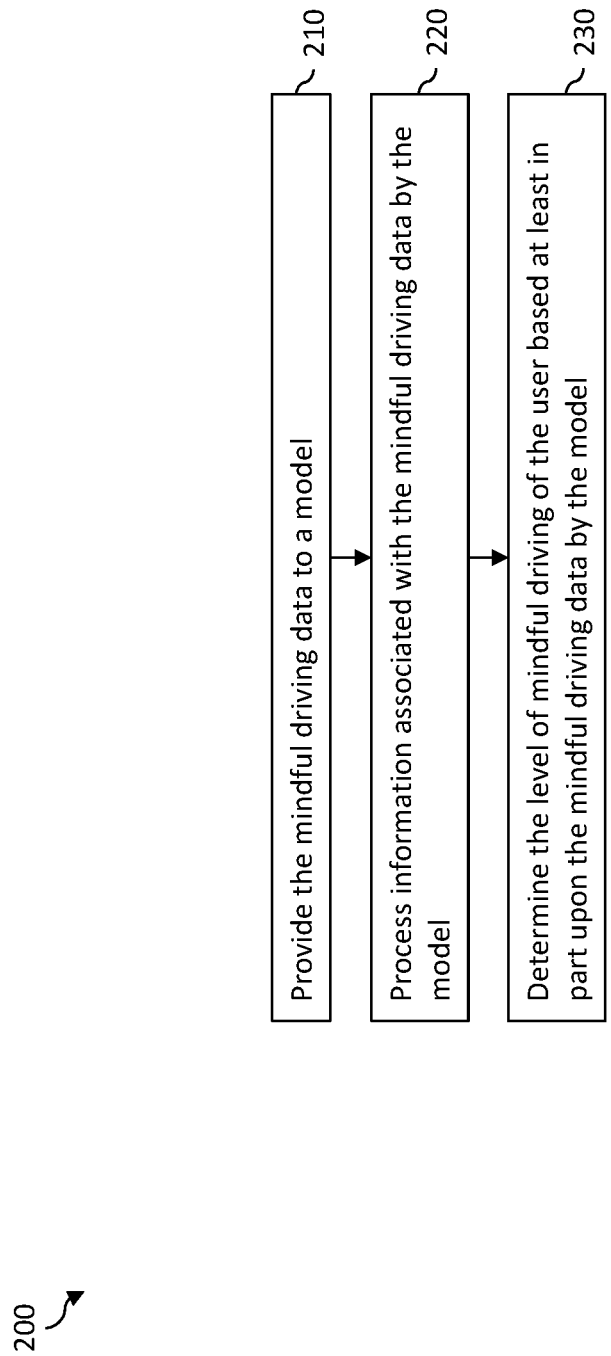
FIG. 2 is a simplified method for determining a level of mindful driving according to certain embodiments of the present disclosure.

II. One or More Methods for Determining Level of Mindful Driving According to Certain Embodiments FIG. 2 is a simplified method for determining the level of mindful driving according to certain embodiments of the present disclosure. This diagram is merely an example, which should not unduly limit the scope of the claims. One of ordinary skill in the art would recognize many variations, alternatives, and modifications. The method 200 includes process 210 for providing the mindful driving data to a model, process 220 for processing the mindful driving data by the model, and process 230 for determining the level of mindful driving by the model. In some examples, the model is a machine learning model. As an example, the model is an artificial neural network. In certain examples, the model is a statistical model. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, some or all processes of the method are performed by a computing device or a processor directed by instructions stored in memory. As an example, some or all processes of the method are performed according to instructions stored in a non-transitory computer-readable medium.

At the process 210, the mindful driving data of the user are provided to the model according to some embodiments. For example, the mindful driving data are collected from various sensors (e.g., one or more accelerometers, one or more gyroscopes, one or more magnetometers, one or more barometers, and/or one or more GPS sensors) associated with the vehicle operated by the user.

At the process 220, the model processes information associated with the mindful driving data of the user according to certain embodiments. In various embodiments, the information associated with the mindful driving data indicate how careful the user is in driving the vehicle (e.g., number of reported accidents/collisions, occurrence of dangerous and/or safe driving events, types of driving maneuvers).

At the process 230, the model determines the level of mindful driving of the user based at least in part upon the mindful driving data according to some embodiments. According to certain embodiments, the model has been trained, and the trained model possesses existing knowledge of which features in the mindful driving data are desirable or useful in determining whether the user exercises safe or unsafe driving. For example, determining the level of mindful driving involves that the trained model analyzes the mindful driving data based upon the existing knowledge. As an example, analyzing the mindful driving data includes various tasks such as performing feature extractions, applying pattern recognition, and/or other suitable tasks.

According to some embodiments, the method 200 is used to determine the level of mindful driving in the process 120 as shown in FIG. 1. According to certain embodiments, the level of mindful driving as determined by the process 230 is used by the process 130 and/or the process 160 as shown in FIG. 1.

Figure 3:
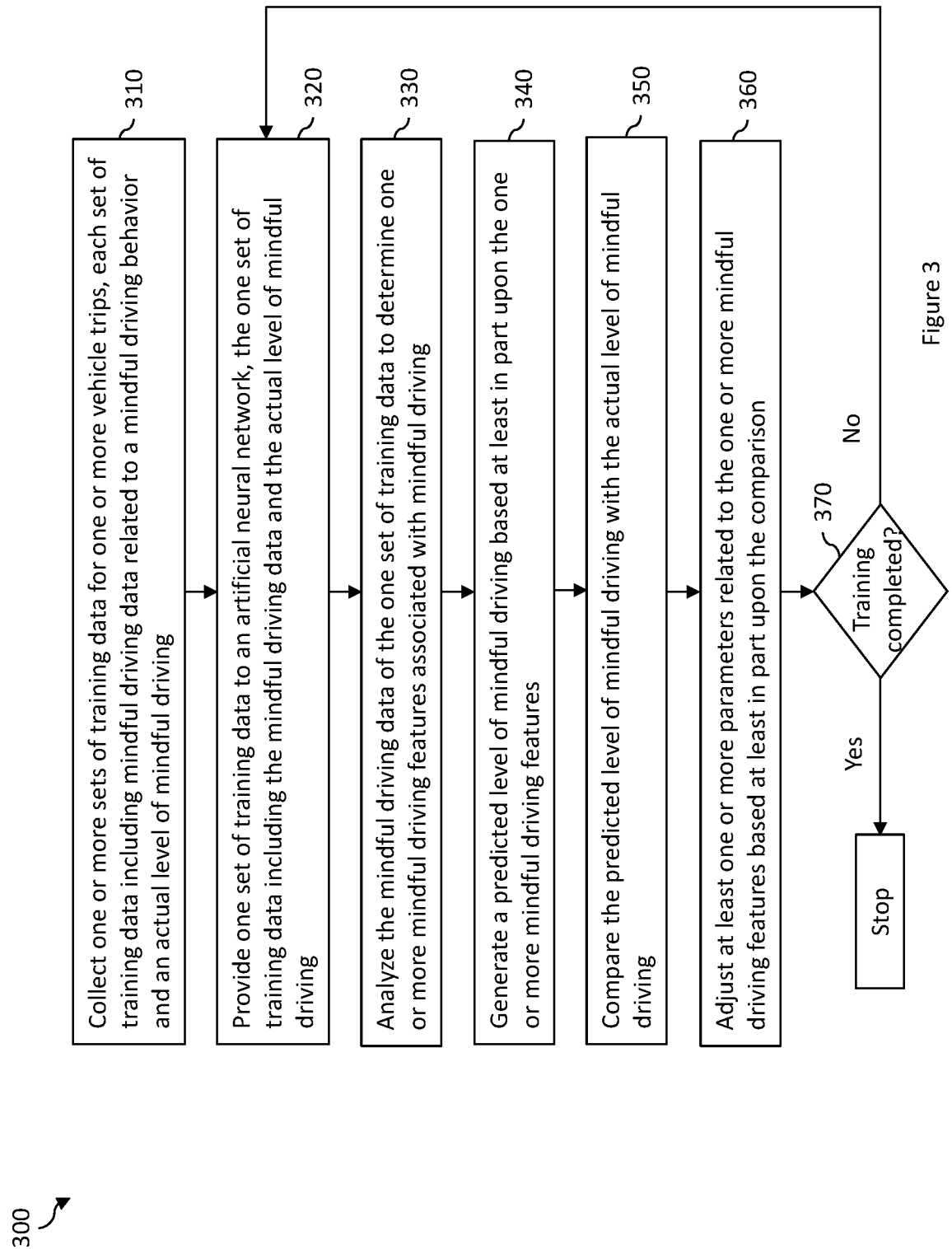
FIG. 3 is a simplified method for training an artificial neural network for determining the level of mindful driving according to certain embodiments of the present disclosure.

FIG. 3 is a simplified method for training an artificial neural network for determining the level of mindful driving according to certain embodiments of the present disclosure. This diagram is merely an example, which should not unduly limit the scope of the claims. One of ordinary skill in the art would recognize many variations, alternatives, and modifications. The method 300 includes process 310 for collecting sets of training data, process 320 for providing one set of training data to an artificial neural network for training, process 330 for analyzing the one set of training data to determine mindful driving features, process 340 for generating a predicted level of mindful driving, process 350 for comparing the predicted level of mindful driving with an actual level of mindful driving, process 360 for adjusting parameters related to the mindful driving features in the artificial neural network, and process 370 for determining whether training of the artificial neural network has been completed. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, some or all processes of the method are performed by a computing device or a processor directed by instructions stored in memory. As an example, some or all processes of the method are performed according to instructions stored in a non-transitory computer-readable medium.

At the process 310, one or more sets of training data for one or more vehicle trips are collected according to some embodiments. For example, each set of training data includes mindful driving data related to a mindful driving behavior and an actual level of mindful driving. As an example, the one or more sets of training data are collected from various users making various vehicle trips. In various embodiments, the one or more sets of training data are collected from sensors (e.g., one or more accelerometers, one or more gyroscopes, one or more magnetometers, one or more barometers, and/or one or more GPS sensors) associated with respective vehicles operated by the various users. In certain embodiments, the one or more sets of training data include claims data, mileage data, and/or other data related to mindful driving behaviors.

At the process 320, one set of training data in the one or more sets of training data is provided to the artificial neural network to train the artificial neural network according to certain embodiments. As an example, the artificial neural network is a convolutional neural network, a recurrent neural network, a modular neural network, or any other suitable type of neural network.

At the process 330, the mindful driving data of the one set of training data are analyzed by the artificial neural network to determine one or more mindful driving features associated with mindful driving according to some embodiments. According to certain embodiments, the one or more mindful driving features indicate whether safe or unsafe driving is being exercised. For example, obeying the speed limit is considered safe driving. As an example, slowing down while making a turn is considered safe driving. For example, texting on a cell phone while driving is considered unsafe driving. As an example, maintaining a tight following distance is considered unsafe driving.

At the process 340, the predicted level of mindful driving is generated by the artificial neural network based at least in part upon the one or more mindful driving features according to certain embodiments. For example, in generating the predicted level of mindful driving, one or more parameters related to the one or more mindful driving features are calculated by the artificial neural network (e.g., weight values associated with various layers of connections in the artificial neural network).

At the process 350, the predicted level of mindful driving is compared with the actual level of mindful driving to determine an accuracy of the predicted level of mindful driving according to some embodiments. According to certain embodiments, the accuracy is determined by using a loss function or a cost function for the one set of training data. In certain examples, the level of mindful driving is proxied by claims data, mileage data, and/or other data related to mindful driving behaviors. For example, the predicted level of mindful driving represents an estimate of a policy's total expected severity of claims for the next year given the policy's driving data. As an example, the total amount of payment for claims is predicted by using various features, such as braking behaviors, speeding, distracted driving, time driving, etc.

At the process 360, based at least in part upon the comparison, the one or more parameters related to the one or more mindful driving features are adjusted by the artificial neural network. For example, the one or more parameters are adjusted in order to reduce (e.g., minimize) the loss function or the cost function.

At the process 370, a determination is made on whether the training has been completed according to certain embodiments. For example, training for the one set of training data is completed when the loss function or the cost function for the one set of training data is sufficiently reduced (e.g., minimized). As an example, training for the artificial neural network is completed when training for each of the one or more sets of training data is accomplished.

In some embodiments, if the process 370 determines that training of the artificial neural network is not yet completed, then the method 300 returns to the process 320 in an iterative manner until training is deemed to be completed.

In certain embodiments, if the process 370 determines that training of the artificial neural network is completed, then the method 300 for training the artificial neural network stops. In some examples, the artificial neural network that has been trained by the method 300 is used as a model by the process 210 of the method 200 as shown in FIG. 2. In certain examples, the trained artificial neural network possesses existing knowledge of which mindful driving features are desirable or useful in terms of determining mindful driving.

Figure 4:
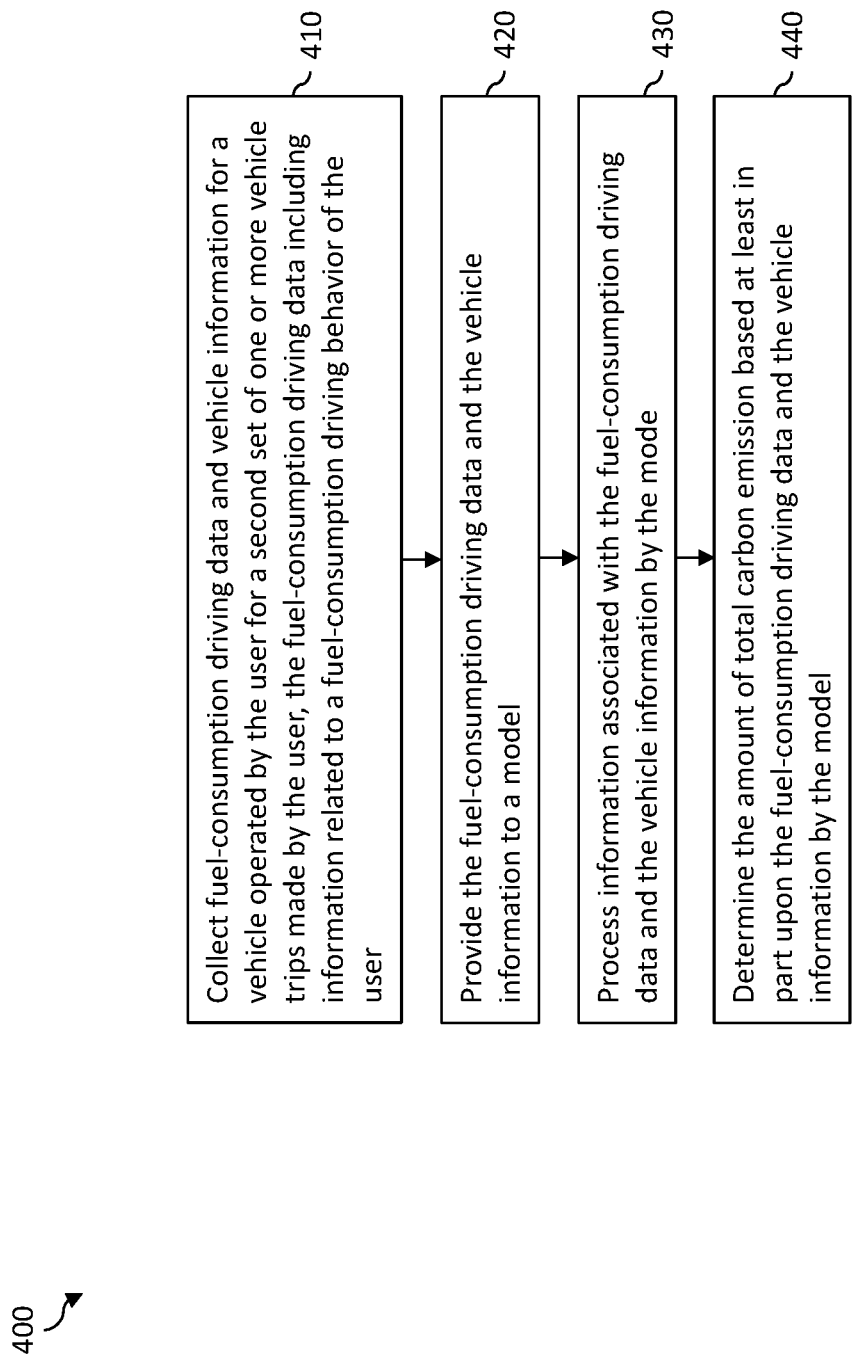
FIG. 4 is a simplified method for determining an amount of total carbon emission according to certain embodiments of the present disclosure.

III. One or More Methods for Determining Amount of Total Carbon Emission According to Certain Embodiments FIG. 4 is a simplified method for determining the amount of total carbon emission according to certain embodiments of the present disclosure. This diagram is merely an example, which should not unduly limit the scope of the claims. One of ordinary skill in the art would recognize many variations, alternatives, and modifications. The method 400 includes process 410 for collecting fuel-consumption driving data and vehicle information for vehicles trips made by the user, process 420 for providing the fuel-consumption driving data and the vehicle information to a model, process 430 for processing the fuel-consumption driving data and the vehicle information by the model, and process 440 for determining the amount of total carbon emission by model. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, some or all processes of the method are performed by a computing device or a processor directed by instructions stored in memory. As an example, some or all processes of the method are performed according to instructions stored in a non-transitory computer-readable medium.

At the process 410, the fuel-consumption driving data and the vehicle information are collected for a second set of one or more vehicle trips made by the user according to some embodiments. For example, the fuel-consumption driving data include information related to a fuel-consumption behavior of the user. As an example, the vehicle information indicate various specifications of the vehicle operated by the user, such as model/year/make, type (e.g., hybrid), engine size, fuel economy (e.g., miles per gallon) and/or other suitable information. According to various embodiments, the fuel-consumption driving data indicate a quantity of fuel (e.g., gasoline) that has been consumed in operating the vehicle during the second set of one or more vehicle trips. In certain embodiments, the fuel-consumption driving data indicate how much fuel has been consumed in view of different driving conditions (e.g., traffic conditions, road conditions, weather conditions, terrain conditions).

According to some embodiments, the second set of one or more vehicle trips are the same as the first set of one or more vehicle trips made by the user. For example, the mindful driving data and the fuel-consumption driving data are collected from the same set of vehicle trips. According to certain embodiments, the second set of one or more vehicle trips are different from the first set of one or more vehicle trips made by the user. As an example, different and separate sets of vehicle trips are used to collect the mindful driving data and the fuel-consumption driving data respectively. In some embodiments, the first set of one or more vehicle trips overlap with the second set of one or more vehicle trips. For example, at least some of the mindful driving data are collected during the first set of one or more vehicle trips and during the second set of one or more vehicle trips. As an example, at least some of the fuel-consumption driving data are collected during the first set of one or more vehicle trips and during the second set of one or more vehicle trips. In certain embodiments, the first set of one or more vehicle trips differ in time from the second set of one or more vehicle trips. For example, the mindful driving data are collected during an initial set of vehicle trips while the fuel-consumption driving data and the vehicle information are collected during a subsequent set of vehicle trips or vice versa.

In various embodiments, the fuel-consumption driving data are collected from various sensors (e.g., fuel level sensors, exhaust sensors, speedometers, engine RPM sensors) associated with the vehicle operated by the user. According to some embodiments, the fuel-consumption driving data are collected continuously or at predetermined time intervals. According to certain embodiments, the fuel-consumption driving data are collected based on a triggering event. For example, the fuel-consumption driving data are collected when each sensor has acquired a threshold amount of sensor measurements. In various embodiments, the vehicle information are identified using a unique identifier of the vehicle (e.g., vehicle identification number (VIN)). In some embodiments, the vehicle information are supplied by the user. In certain embodiments, the vehicle information are collected from a manufacturer of the vehicle.

At the process 420, the fuel-consumption driving data and the vehicle information are provided to the model according to some embodiments. In some examples, the model is a machine learning model. As an example, the model is an artificial neural network. In certain examples, the model is a statistical model. At the process 430, the model processes information associated with the fuel-consumption driving data and the vehicle information according to certain embodiments. According to various embodiments, the information associated with the fuel-consumption driving data and the vehicle information relate to how much fuel has been consumed and the various specifications of the vehicle, respectively.

At the process 440, the model determines the amount of total carbon emission of the user based at least in part upon the fuel-consumption driving data and the vehicle information according to some embodiments. According to certain embodiments, the model has been trained, and the trained model possesses existing knowledge of which features in the fuel-consumption driving data and/or the vehicle information are desirable or useful in determining the amount of total carbon emission. For example, determining the amount of total carbon emission involves that the trained model analyzes the fuel-consumption driving data and/or the vehicle information based upon the existing knowledge. As an example, analyzing the fuel-consumption driving data and/or the vehicle information includes various tasks such as performing feature extractions, applying pattern recognition, and/or other suitable tasks.

According to some embodiments, the method 400 is used to determine the amount of total carbon emission in the process 140 as shown in FIG. 1. According to certain embodiments, the amount of total carbon emission as determined by the process 440 is used by the process 150 as shown in FIG. 1.

Figure 5:
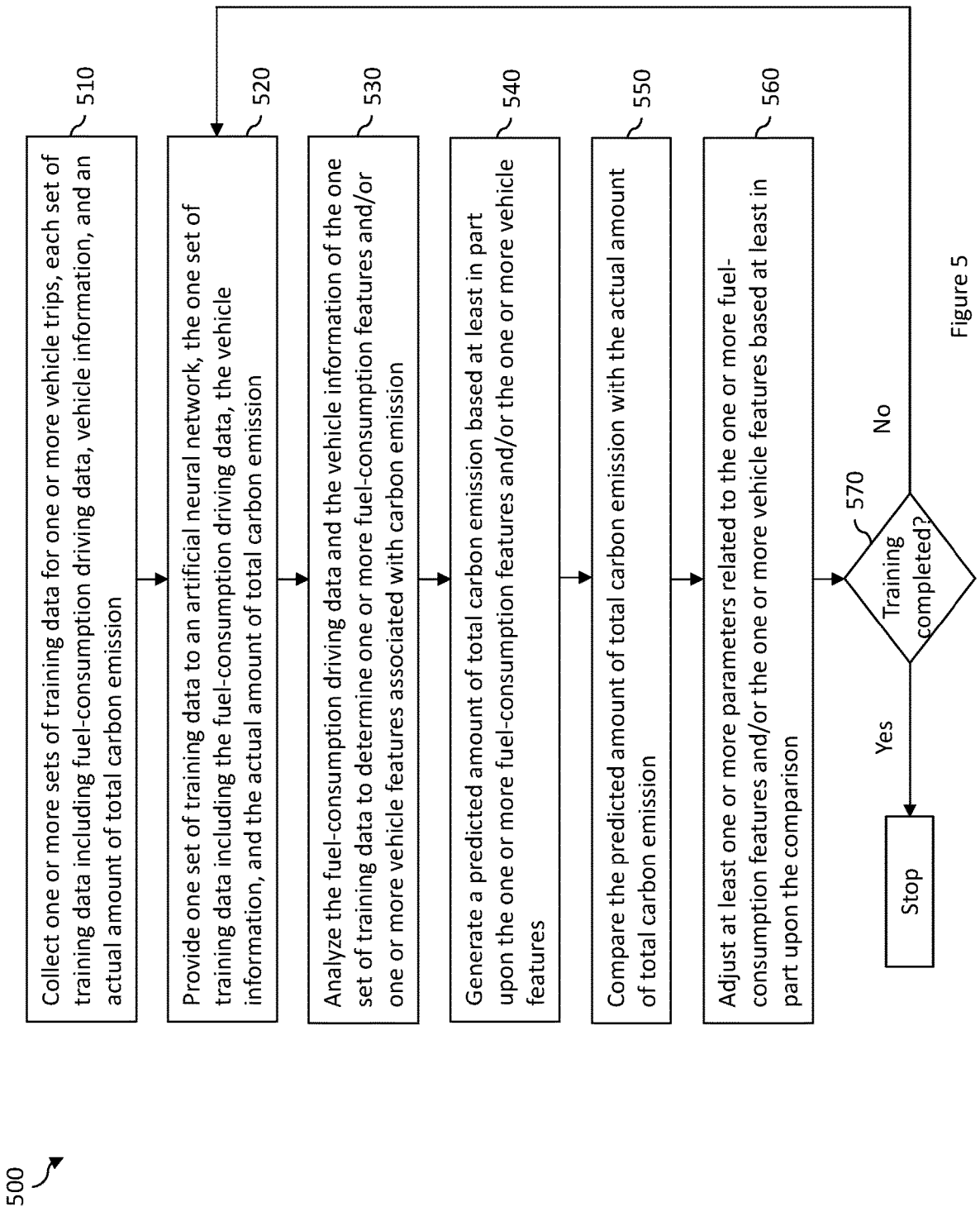
FIG. 5 is a simplified method for training an artificial neural network for determining the amount of total carbon emission according to certain embodiments of the present disclosure.

FIG. 5 is a simplified method for training an artificial neural network for determining the amount of total carbon emission according to some embodiments of the present disclosure. This diagram is merely an example, which should not unduly limit the scope of the claims. One of ordinary skill in the art would recognize many variations, alternatives, and modifications. The method 500 includes process 510 for collecting sets of training data, process 520 for providing one set of training data to an artificial neural network for training, process 530 for analyzing the one set of training data to determine fuel-consumption features and/or vehicle features, process 540 for generating a predicted amount of total carbon emission, process 550 for comparing the predicted amount of total carbon emission with an actual amount of total carbon emission, process 560 for adjusting parameters related to the fuel-consumption features and/or the vehicle features in the artificial neural network, and process 570 for determining whether training of the artificial neural network has been completed. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, some or all processes of the method are performed by a computing device or a processor directed by instructions stored in memory. As an example, some or all processes of the method are performed according to instructions stored in a non-transitory computer-readable medium.

At the process 510, one or more sets of training data for one or more vehicle trips are collected according to some embodiments. For example, each set of training data includes fuel-consumption driving data, vehicle information, and an actual amount of total carbon emission. As an example, the one or more sets of training data are collected from various users making various vehicle trips. In various embodiments, the one or more sets of training data are collected from sensors (e.g., one or more accelerometers, one or more gyroscopes, one or more magnetometers, one or more barometers, and/or one or more GPS sensors) associated with respective vehicles operated by the various users.

At the process 520, one set of training data in the one or more sets of training data is provided to the artificial neural network to train the artificial neural network according to certain embodiments. As an example, the artificial neural network is a convolutional neural network, a recurrent neural network, a modular neural network, or any other suitable type of neural network.

At the process 530, the fuel-consumption driving data and the vehicle information of the one set of training data are analyzed by the artificial neural network to determine one or more fuel-consumption features and/or one or more vehicle features associated with carbon emission according to some embodiments. According to certain embodiments, the one or more fuel-consumption features and/or the one or more vehicle features indicate how much fuel is being consumed.

At the process 540, the predicted amount of total carbon emission is generated by the artificial neural network based at least in part upon the one or more fuel-consumption features and/or the one or more vehicle features according to certain embodiments. For example, in generating the predicted amount of total carbon emission, one or more parameters related to the one or more fuel-consumption features and/or the one or more vehicle features are calculated by the artificial neural network (e.g., weight values associated with various layers of connections in the artificial neural network).

At the process 550, the predicted amount of total carbon emission is compared with the actual amount of total carbon emission to determine an accuracy of the predicted amount of total carbon emission according to some embodiments. According to certain embodiments, the accuracy is determined by using a loss function or a cost function for the one set of training data.

At the process 560, based at least in part upon the comparison, the one or more parameters related to the one or more fuel-consumption features and/or the one or more vehicle features are adjusted by the artificial neural network. For example, the one or more parameters are adjusted in order to reduce (e.g., minimize) the loss function or the cost function.

At the process 570, a determination is made on whether the training has been completed according to certain embodiments. For example, training for the one set of training data is completed when the loss function or the cost function for the one set of training data is sufficiently reduced (e.g., minimized). As an example, training for the artificial neural network is completed when training for each of the one or more sets of training data is accomplished.

In some embodiments, if the process 570 determines that training of the artificial neural network is not yet completed, then the method 500 returns to the process 520 in an iterative manner until training is deemed to be completed.

In certain embodiments, if the process 570 determines that training of the artificial neural network is completed, then the method 500 for training the artificial neural network stops. In some examples, the artificial neural network that has been trained by the method 500 is used as a model by the process 420 of the method 400 as shown in FIG. 4. In certain examples, the trained artificial neural network possesses existing knowledge of which fuel-consumptions features and/or which vehicle features are desirable or useful in terms of determining carbon emission.

Figure 6:
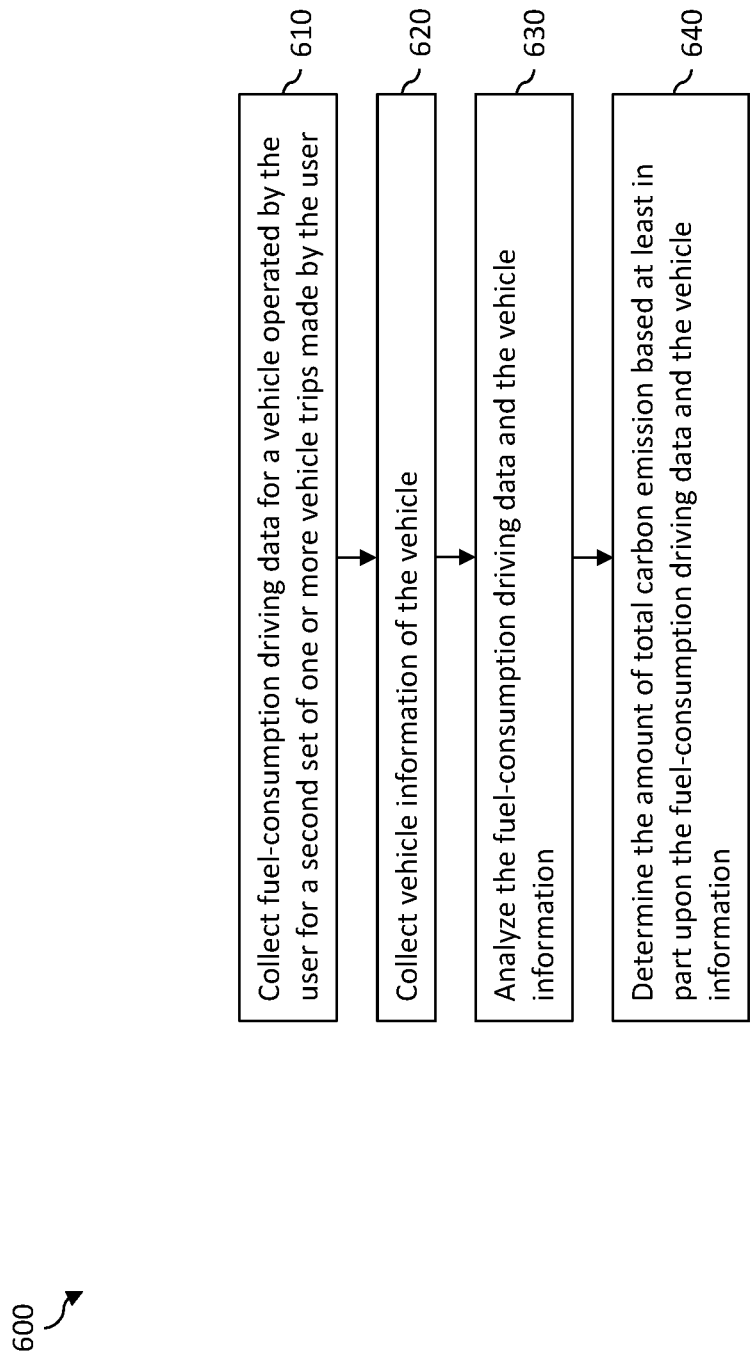
FIG. 6 is a simplified method for determining the amount of total carbon emission according to certain embodiments of the present disclosure.

FIG. 6 is a simplified method for determining the amount of total carbon emission according to certain embodiments of the present disclosure. This diagram is merely an example, which should not unduly limit the scope of the claims. One of ordinary skill in the art would recognize many variations, alternatives, and modifications. The method 600 includes process 610 for collecting fuel-consumption driving data, process 620 for collecting vehicle information, process 630 for analyzing the fuel-consumption driving data and the vehicle information, and process 640 for determining the amount of total carbon emission. Although the above have been shown using a selected group of processes for the methods, there can be many alternatives, modifications, and variations. For example, some of the processes may be expanded and/or combined. Other processes may be inserted to those noted above. Depending upon the embodiment, the sequence of processes may be interchanged with others replaced. For example, some or all processes of the methods are performed by a computing device or a processor directed by instructions stored in memory. As an example, some or all processes of the methods are performed according to instructions stored in a non-transitory computer-readable medium.

At the process 610, the fuel-consumption driving data are collected for the second set of one or more vehicle trips made by the user according to some embodiments. For example, the fuel-consumption driving data indicate a quantity of fuel that has been consumed in operating the vehicle during the second set of one or more vehicle trips. At the process 620, the vehicle information are collected for the vehicle operated by the user. As an example, the vehicle information indicate various specifications of the vehicle (e.g., model, year, make, fuel economy). According to various embodiments, the fuel-consumption driving data are collected from various sensors (e.g., fuel level sensors, exhaust sensors) associated with the vehicle, while the vehicle information are identified using a unique identifier of the vehicle (e.g., VIN).

At the process 630, the fuel-consumption driving data and the vehicle information are analyzed according to certain embodiments. At the process 640, the amount of total carbon emission is determined based at least in part upon the fuel-consumption driving data and the vehicle information according to some embodiments. For example, the fuel-consumption driving data and the vehicle information are analyzed using any suitable mathematical formula, algorithm, and/or computational method (e.g., decision tree, Bayesian network, finite-state machine, support vector machine) to determine the amount of total carbon emission.

According to some embodiments, the method 600 is used to determine the amount of total carbon emission in the process 140 as shown in FIG. 1. According to certain embodiments, the amount of total carbon emission as determined by the process 640 is used by the process 150 as shown in FIG. 1.

Figure 7:
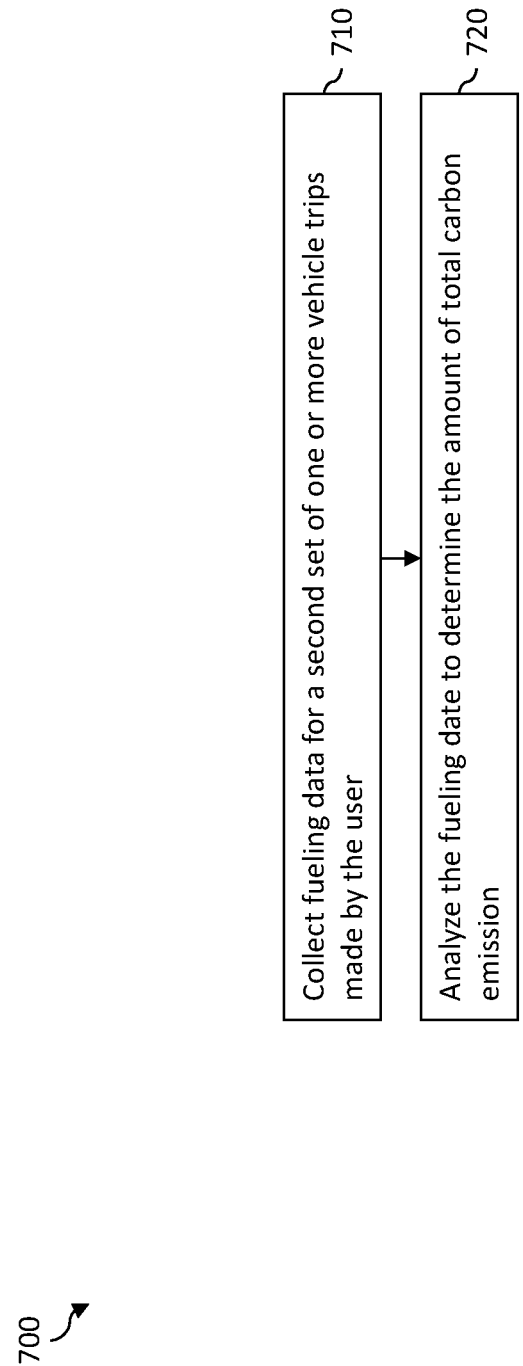
FIG. 7 is a simplified method for determining the amount of total carbon emission according to some embodiments of the present disclosure.

FIG. 7 is a simplified method for determining the amount of total carbon emission according to some embodiments of the present disclosure. This diagram is merely an example, which should not unduly limit the scope of the claims. One of ordinary skill in the art would recognize many variations, alternatives, and modifications. The method 700 includes process 710 for collecting fueling data and process 720 for determining the amount of total carbon emission. Although the above have been shown using a selected group of processes for the methods, there can be many alternatives, modifications, and variations. For example, some of the processes may be expanded and/or combined. Other processes may be inserted to those noted above. Depending upon the embodiment, the sequence of processes may be interchanged with others replaced. For example, some or all processes of the methods are performed by a computing device or a processor directed by instructions stored in memory. As an example, some or all processes of the methods are performed according to instructions stored in a non-transitory computer-readable medium.

At the process 710, the fuel data are collected for the second set of one or more vehicle trips made by the user according to some embodiments. For example, the fueling data indicate how much fuel was consumed by the vehicle during the one or more second vehicle trips. In some embodiments, the fueling data are supplied by the user. As an example, the user manually inputs a certain amount of fuel that was added between a set of dates in which the one or more second vehicle trips occurred. In certain embodiments, the fueling data are automatically collected from one or more sensors (e.g., a fuel gauge) associated with the vehicle.

At the process 720, the fueling data are analyzed to determine the amount of total carbon emission. For example, the fueling data are analyzed using any suitable mathematical formula, algorithm, and/or computational method (e.g., decision tree, Bayesian network, finite-state machine, support vector machine) to determine the amount of total carbon emission.

According to some embodiments, the method 700 is used to determine the amount of total carbon emission in the process 140 as shown in FIG. 1. According to certain embodiments, the amount of total carbon emission as determined by the process 720 is used by the process 150 as shown in FIG. 1.

Figure 8:
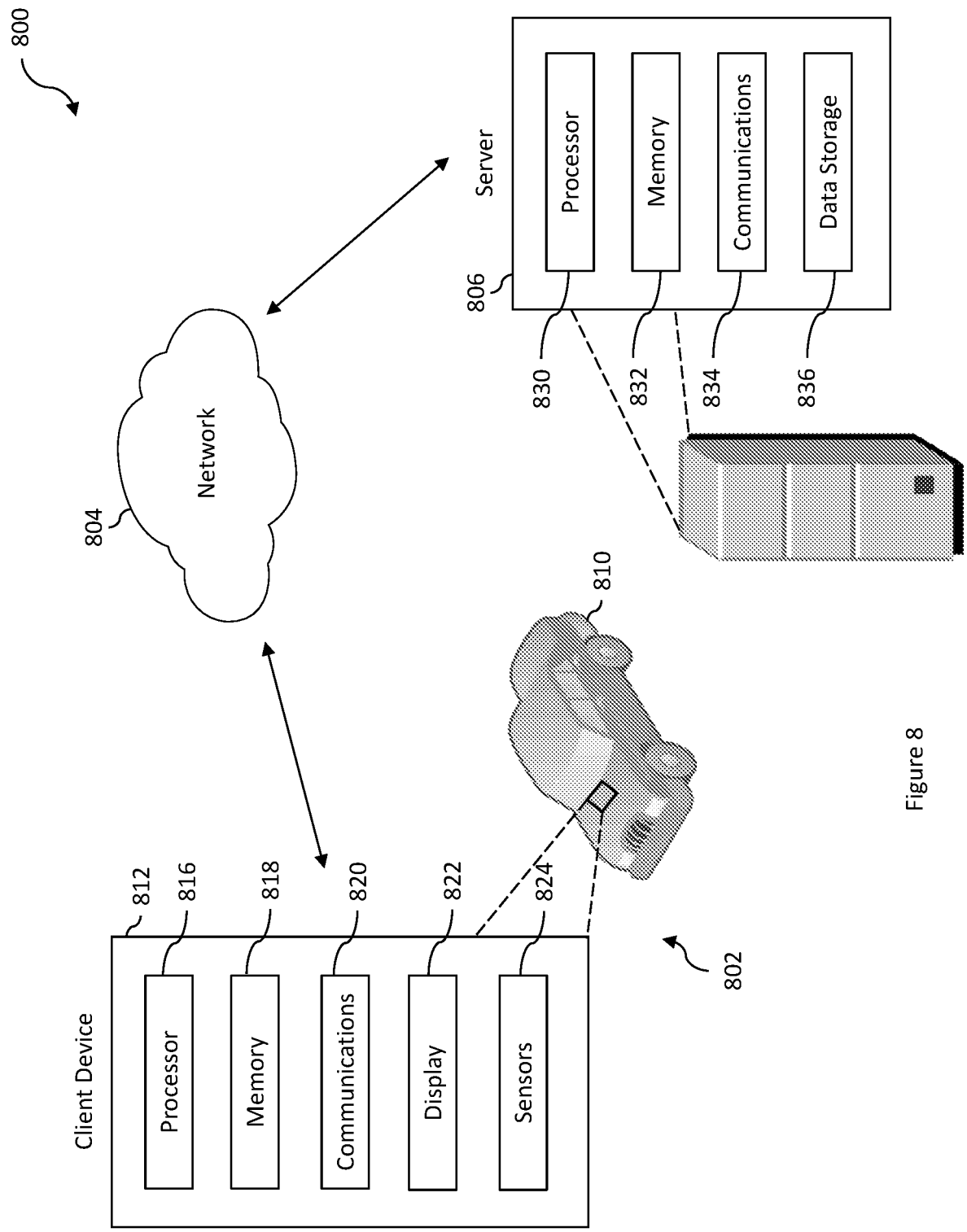
FIG. 8 is a simplified system for providing carbon offsets according to certain embodiments of the present disclosure.

IV. One or More Systems for Providing Carbon Offsets According to Certain Embodiments FIG. 8 is a simplified system for providing carbon offsets according to certain embodiments of the present disclosure. This diagram is merely an example, which should not unduly limit the scope of the claims. One of ordinary skill in the art would recognize many variations, alternatives, and modifications. The system 800 includes a vehicle system 802, a network 804, and a server 806. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced.

In various embodiments, the system 800 is used to implement the method 100, the method 200, the method 300, the method 400, the method 500, the method 600 and/or the method 700. According to certain embodiments, the vehicle system 802 includes a vehicle 810 and a client device 812 associated with the vehicle 810. For example, the client device 812 is an on-board computer embedded or located in the vehicle 810. As an example, the client device 812 is a mobile device (e.g., a smartphone) that is connected (e.g., via wired or wireless links) to the vehicle 810. As an example, the client device 812 includes a processor 816 (e.g., a central processing unit (CPU), a graphics processing unit (GPU)), a memory 818 (e.g., random-access memory (RAM), read-only memory (ROM), flash memory), a communications unit 820 (e.g., a network transceiver), a display unit 822 (e.g., a touchscreen), and one or more sensors 824 (e.g., an accelerometer, a gyroscope, a magnetometer, a barometer, a GPS sensor).

In some embodiments, the vehicle 810 is operated by the user. In certain embodiments, multiple vehicles 810 exist in the system 800 which are operated by respective users. As an example, during vehicle trips, the one or more sensors 824 monitor the vehicle 810 by collecting data associated with various operating parameters of the vehicle, such as speed, acceleration, braking, location, engine status, fuel level, as well as other suitable parameters. In certain embodiments, the collected data include vehicle telematics data. According to some embodiments, the data are collected continuously, at predetermined time intervals, and/or based on a triggering event (e.g., when each sensor has acquired a threshold amount of sensor measurements). In various embodiments, the collected data represent the mindful driving data, the fuel-consumption driving data, the vehicle information, and/or the fueling data in the method 100, the method 200, the method 400, the method 600 and/or the method 700, and/or the one or more sets of training data in the method 300 and/or the method 500.

According to certain embodiments, the collected data are stored in the memory 818 before being transmitted to the server 806 using the communications unit 822 via the network 804 (e.g., via a local area network (LAN), a wide area network (WAN), the Internet). In some embodiments, the collected data are transmitted directly to the server 806 via the network 804. In certain embodiments, the collected data are transmitted to the server 806 via a third party. For example, a data monitoring system stores any and all data collected by the one or more sensors 824 and transmits those data to the server 806 via the network 804 or a different network.

According to certain embodiments, the server 806 includes a processor 830 (e.g., a microprocessor, a microcontroller), a memory 832, a communications unit 834 (e.g., a network transceiver), and a data storage 836 (e.g., one or more databases). In some embodiments, the server 806 is a single server, while in certain embodiments, the server 806 includes a plurality of servers with distributed processing. In FIG. 8, the data storage 836 is shown to be part of the server 806. In some embodiments, the data storage 836 is a separate entity coupled to the server 806 via a network such as the network 804. In certain embodiments, the server 806 includes various software applications stored in the memory 832 and executable by the processor 830. For example, these software applications include specific programs, routines, or scripts for performing functions associated with the method 100, the method 200, the method 300, the method 400, the method 500, the method 600 and/or the method 700. As an example, the software applications include general-purpose software applications for data processing, network communication, database management, web server operation, and/or other functions typically performed by a server.

According to various embodiments, the server 806 receives, via the network 804, the data collected by the one or more sensors 824 using the communications unit 834 and stores the data in the data storage 836. For example, the server 806 then processes the data to perform one or more processes of the method 100, one or more processes of the method 200, one or more processes of the method 300, one or more processes of the method 400, one or more processes of the method 500, one or more processes of the method 600, and/or one or more processes of the method 700.

According to certain embodiments, the adjustment to the insurance premium determined in the method 100 is transmitted back to the client device 812, via the network 804, to be provided (e.g., displayed) to the user via the display unit 822.

In some embodiments, one or more processes of the method 100, one or more processes of the method 200, one or more processes of the method 300, one or more processes of the method 400, one or more processes of the method 500, one or more processes of the method 600, and/or one or more processes of the method 700 are performed by the client device 812. For example, the processor 816 of the client device 812 processes the data collected by the one or more sensors 824 to perform one or more processes of the method 100, one or more processes of the method 200, one or more processes of the method 300, one or more processes of the method 400, one or more processes of the method 500, one or more processes of the method 600, and/or one or more processes of the method 700.

V. Examples of Certain Embodiments of the Present Disclosure

According to some embodiments, a method for providing one or more carbon offsets includes collecting mindful driving data for one or more first vehicle trips made by a user. The mindful driving data includes information related to a mindful driving behavior of the user. Also, the method includes analyzing the mindful driving data to determine a level of mindful driving of the user. Additionally, the method includes determining a level of carbon offset reward based at least in part upon the level of mindful driving of the user and an amount of total carbon emission of the user. Moreover, the method includes providing an amount of carbon offset reward based at least in part upon the level of carbon offset reward and the amount of total carbon emission. For example, the method is implemented according to at least FIG. 1.

According to certain embodiments, a computing device for providing one or more carbon offsets includes one or more processors and a memory that stores instructions for execution by the one or more processors. The instructions, when executed, cause the one or more processors to collect mindful driving data for one or more first vehicle trips made by a user. The mindful driving data includes information related to a mindful driving behavior of the user. Also, the instructions, when executed, cause the one or more processors to analyze the mindful driving data to determine a level of mindful driving of the user. Additionally, the instructions, when executed, cause the one or more processors to determine a level of carbon offset reward based at least in part upon the level of mindful driving of the user and an amount of total carbon emission of the user. Moreover, the instructions, when executed, cause the one or more processors to provide an amount of carbon offset reward based at least in part upon the level of carbon offset reward and the amount of total carbon emission. For example, the computing device is implemented according to at least FIG. 8.

According to some embodiments, a non-transitory computer-readable medium stores instructions for providing one or more carbon offsets. The instructions are executed by one or more processors of a computing device. The non-transitory computer-readable medium includes instructions to collect mindful driving data for one or more first vehicle trips made by a user. The mindful driving data includes information related to a mindful driving behavior of the user. Also, the non-transitory computer-readable medium includes instructions to analyze the mindful driving data to determine a level of mindful driving of the user. Additionally, the non-transitory computer-readable medium includes instructions to determine a level of carbon offset reward based at least in part upon the level of mindful driving of the user and an amount of total carbon emission of the user. Moreover, the non-transitory computer-readable medium includes instructions to provide an amount of carbon offset reward based at least in part upon the level of carbon offset reward and the amount of total carbon emission. For example, the non-transitory computer-readable medium is implemented according to at least FIG. 1 and/or FIG. 8.

VI. Examples of Machine Learning According to Certain Embodiments

According to some embodiments, a processor or a processing element may be trained using supervised machine learning and/or unsupervised machine learning, and the machine learning may employ an artificial neural network, which, for example, may be a convolutional neural network, a recurrent neural network, a deep learning neural network, a reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

According to certain embodiments, machine learning programs may be trained by inputting sample data sets or certain data into the programs, such as images, object statistics and information, historical estimates, and/or actual repair costs. The machine learning programs may utilize deep learning algorithms that may be primarily focused on pattern recognition and may be trained after processing multiple examples. The machine learning programs may include Bayesian Program Learning (BPL), voice recognition and synthesis, image or object recognition, optical character recognition, and/or natural language processing. The machine learning programs may also include natural language processing, semantic analysis, automatic reasoning, and/or other types of machine learning.

According to some embodiments, supervised machine learning techniques and/or unsupervised machine learning techniques may be used. In supervised machine learning, a processing element may be provided with example inputs and their associated outputs and may seek to discover a general rule that maps inputs to outputs, so that when subsequent novel inputs are provided the processing element may, based upon the discovered rule, accurately predict the correct output. In unsupervised machine learning, the processing element may need to find its own structure in unlabeled example inputs.

VII. Additional Considerations According to Certain Embodiments

For example, some or all components of various embodiments of the present disclosure each are, individually and/or in combination with at least another component, implemented using one or more software components, one or more hardware components, and/or one or more combinations of software and hardware components. As an example, some or all components of various embodiments of the present disclosure each are, individually and/or in combination with at least another component, implemented in one or more circuits, such as one or more analog circuits and/or one or more digital circuits. For example, while the embodiments described above refer to particular features, the scope of the present disclosure also includes embodiments having different combinations of features and embodiments that do not include all of the described features. As an example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Certain implementations may also be used, however, such as firmware or even appropriately designed hardware configured to perform the methods and systems described herein.

The systems' and methods' data (e.g., associations, mappings, data input, data output, intermediate data results, final data results) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A method for operating a computing device including one or more processors, the method comprising:
   receiving, by the computing device, trip data defining occurrence of a vehicle trip by a user in a vehicle;
   using a trained model, by the computing device using the trip data, to predict levels of mindful driving behavior, wherein the trained model is configured to be trained by:
   collecting one or more sets of training data corresponding to levels of mindful driving behavior, the sets of training data adapted to be collected from one or more sensors associated with the vehicle;
   processing the one or more sets of training data with the trained model to determine one or more mindful driving features;
   generating a predicted level of mindful driving based on the one or more mindful driving features, the predicted level of mindful driving including one or more parameters; and
   adjusting the one or more parameters associated with the predicted level of mindful driving to update the trained model;
   receiving, by the computing device, fuel-consumption data, from the one or more sensors associated with the vehicle;
   receiving, by the computing device, vehicle information of the vehicle;
   receiving, by the computing device, mindful driving data including information related to a mindful driving behavior of the user;
   processing the mindful driving data by the computing device using the trained model to determine a level of mindful driving behavior of the user during the vehicle trip;
   calculating a level of carbon offset reward based upon the level of mindful driving behavior, wherein the level of carbon offset reward represents a percentage value;
   determining, by the computing device in response to the trip data, an amount of total carbon emission of the vehicle during the vehicle trip based upon the fuel-consumption data and the vehicle information;
   calculating, by the computing device, an amount of carbon offset reward based upon the level of carbon offset reward and the amount of total carbon emission; and
   determining a monetary value associated with the amount of carbon offset reward to plant trees.

2. The method of claim 1, wherein the amount of carbon offset reward corresponds to an amount of cost needed to recapture the amount of total carbon emission by planting the one or more trees.

3. The method of claim 1, wherein the processing, by the computing device, the mindful driving data includes:
   providing the mindful driving data;
   processing information associated with the mindful driving data; and
   determining the level of mindful driving behavior of the user based upon the mindful driving data.

4. The method of claim 1, further comprising:
    determining, by the computing device, a level of insurance discount based upon the level of mindful driving behavior of the user; and
    generating, by the computing device, an adjustment to an insurance premium for the user based upon the level of insurance discount and an amount of insurance premium.

5. The method of claim 1, further comprising:
    determining, by the computing device, an insurance marketing offer, an eligibility qualification, or a quote amount based upon the level of mindful driving behavior of the user.

6. The method of claim 1, wherein the level of carbon offset reward represents a percentage value of carbon offset.

7. The method of claim 6, wherein the calculating, by the computing device, the amount of carbon offset reward includes:
    determining the amount of carbon offset reward to be equal to an amount of cost needed to completely recapture the amount of total carbon emission multiplied by the percentage value of carbon offset.

8. A computing device, comprising:
    one or more processors; and
    a memory storing instructions that, when executed by the one or more processors, cause the one or more processors to:
        receive trip data defining occurrence of a vehicle trip by a user in a vehicle;
        use a trained model, using the trip data, to predict levels of mindful driving behavior, wherein the trained model is configured to be trained by:
            collecting one or more sets of training data corresponding to levels of mindful driving behavior, the sets of training data adapted to be collected from one or more sensors associated with the vehicle;
            processing the one or more sets of training data with the trained model to determine one or more mindful driving features;
            generating a predicted level of mindful driving based on the one or more mindful driving features, the predicted level of mindful driving including one or more parameters; and
            adjusting the one or more parameters associated with the predicted level of mindful driving to update the trained model;
        receive, fuel-consumption data, from the one or more sensors associated with the vehicle;
        receive vehicle information of the vehicle;
        receive mindful driving data including information related to a mindful driving behavior of the user;
        process the mindful driving data using the trained model to determine a level of mindful driving behavior of the user;
        calculate a level of carbon offset reward based upon the level of mindful driving behavior, wherein the level of carbon offset reward represents a percentage value;
        determine, in response to the trip data, an amount of total carbon emission of the vehicle during the vehicle trip based upon the fuel-consumption data and the vehicle information;
        calculate an amount of carbon offset reward based upon the level of carbon offset reward and the amount of total carbon emission; and
        determine a monetary value associated with the amount of carbon offset reward to plant trees.

9. The computing device of claim 8, wherein the amount of carbon offset reward corresponds to an amount of cost needed to recapture the amount of total carbon emission by planting the one or more trees.

10. The computing device of claim 8, wherein the instructions that cause the one or more processors to process the mindful driving data further comprise instructions that cause the one or more processors to:
    provide the mindful driving data;
    process information associated with the mindful driving data; and
    determine the level of mindful driving behavior of the user based upon the mindful driving data.

11. The computing device of claim 8 wherein the instructions further comprise instructions that, when executed by the one or more processors, cause the one or more processors to:
    determine a level of insurance discount based upon the level of mindful driving behavior of the user; and
    generate an adjustment to an insurance premium for the user based upon the level of insurance discount and an amount of insurance premium.

12. The computing device of claim 8, wherein the instructions further comprise instructions that, when executed by the one or more processors, cause the one or more processors to:
    determine an insurance marketing offer, an eligibility qualification, or a quote amount based upon the level of mindful driving of the user.

13. The computing device of claim 8 wherein the level of carbon offset reward represents a percentage value of carbon offset.

14. The computing device of claim 13, wherein the instructions that cause the one or more processors to provide the amount of carbon offset reward further comprise instructions that cause the one or more processors to:
    determine the amount of carbon offset reward to be equal to an amount of cost needed to completely recapture the amount of total carbon emission multiplied by the percentage value of carbon offset.

15. A non-transitory computer-readable medium storing instructions, the instructions when executed by one or more processors of a computing device, cause the computing device to:
    receive trip data defining occurrence of a vehicle trip by a user in a vehicle;
    use a trained model, using the trip data, to predict levels of mindful driving behavior, wherein the trained model is configured to be trained by:
        collecting one or more sets of training data corresponding to levels of mindful driving behavior, the sets of training data adapted to be collected from one or more sensors associated with the vehicle;
        processing the one or more sets of training data with the trained model to determine one or more mindful driving features;
        generating a predicted level of mindful driving based on the one or more mindful driving features, the predicted level of mindful driving including one or more parameters; and
        adjusting the one or more parameters associated with the predicted level of mindful driving to update the trained model;
    receive, fuel-consumption data, from one or more sensors associated with the vehicle;
    receive vehicle information of the vehicle;

receive mindful driving data including information related to a mindful driving behavior of the user;

process the mindful driving data using the trained model to determine a level of mindful driving behavior of the user;

calculate a level of carbon offset reward based upon the level of mindful driving behavior, wherein the level of carbon offset reward represents a percentage value;

determine, in response to the trip data, an amount of total carbon emission of the vehicle during the vehicle trip based upon the fuel-consumption data and the vehicle information; and calculate an amount of carbon offset reward based upon the level of carbon offset reward and the amount of total carbon emission; and determine a monetary value associated with the amount of carbon offset reward to plant trees.

16. The non-transitory computer-readable medium of claim 15, wherein the instructions when executed by the one or more processors that cause the computing device to process the mindful driving data to determine the level of mindful driving behavior of the user further cause the computing device to:

provide the mindful driving data;

process information associated with the mindful driving data; and determine the level of mindful driving behavior of the user based upon the mindful driving data.

17. The non-transitory computer-readable medium of claim 15, wherein the level of carbon offset reward represents a percentage value of carbon offset, and the instructions when executed by the one or more processors that cause the computing device to provide the amount of carbon offset reward based upon the level of carbon offset reward and the amount of total carbon emission further cause the computing device to:

determine the amount of carbon offset reward to be equal to an amount of cost needed to recapture the amount of total carbon emission multiplied by the percentage value of carbon offset.

* * * * *